Oct. 2, 1962 W. L. GERRANS 3,056,465
PRUNING AND FRUIT PICKING RIG
Filed March 14, 1955 4 Sheets-Sheet 1
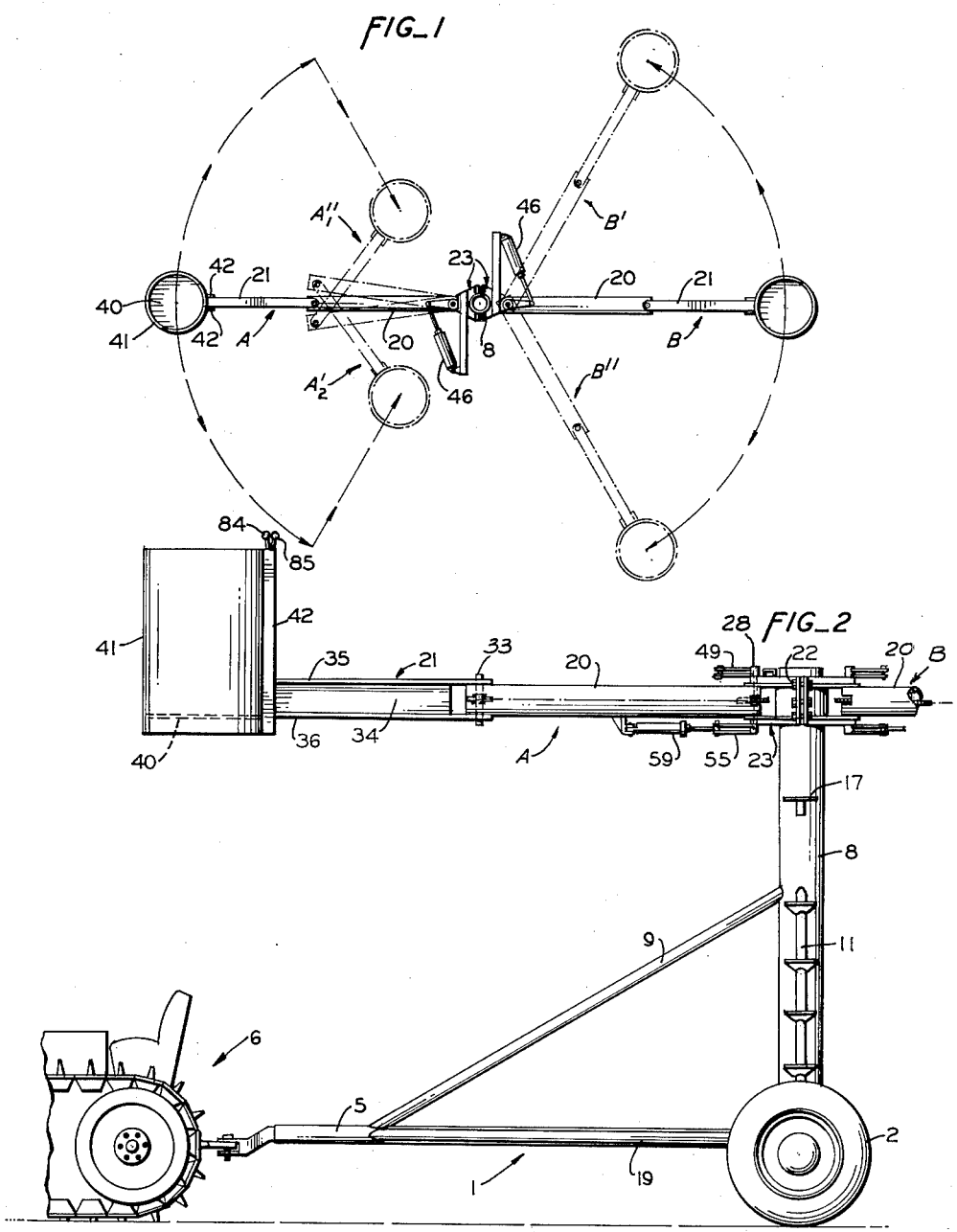
INVENTOR.
WILLIAM L. GERRANS
BY
Boyken, Mohler & Wood.
ATTORNEYS

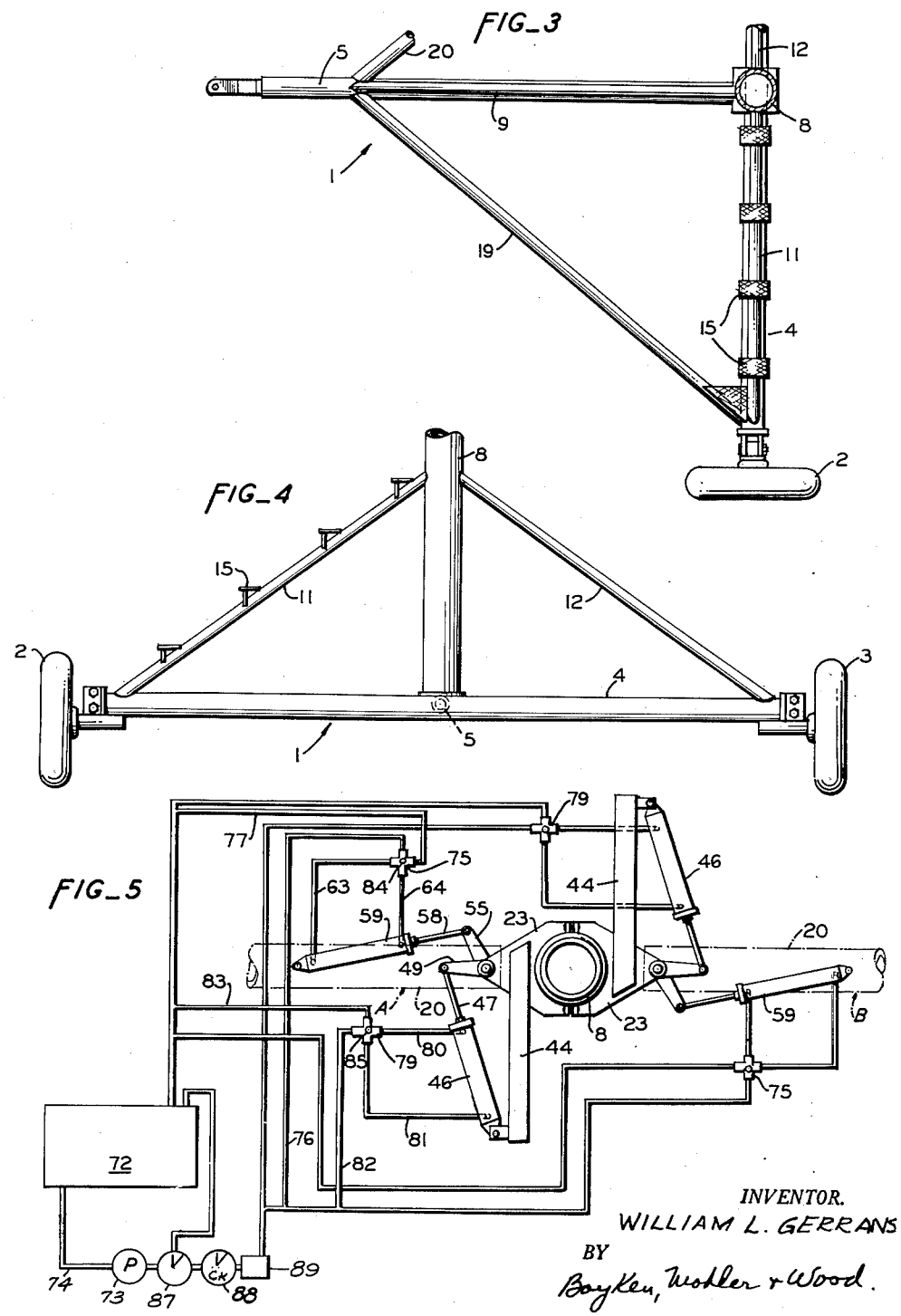

Oct. 2, 1962   W. L. GERRANS   3,056,465
PRUNING AND FRUIT PICKING RIG
Filed March 14, 1955   4 Sheets-Sheet 3
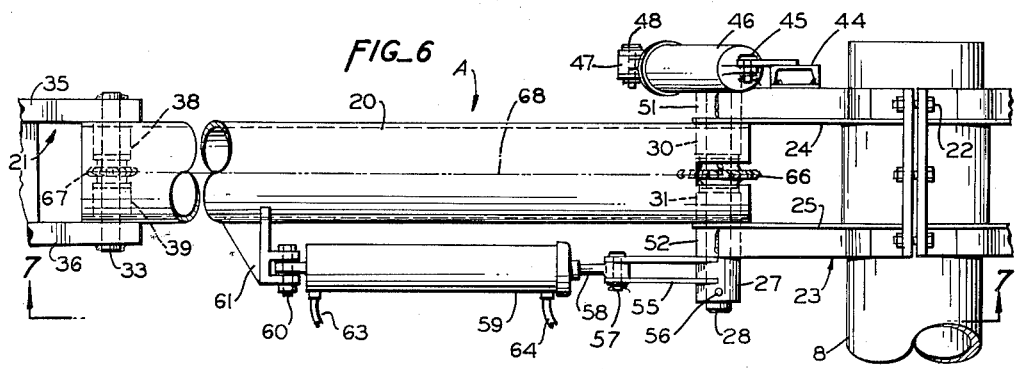
FIG_6
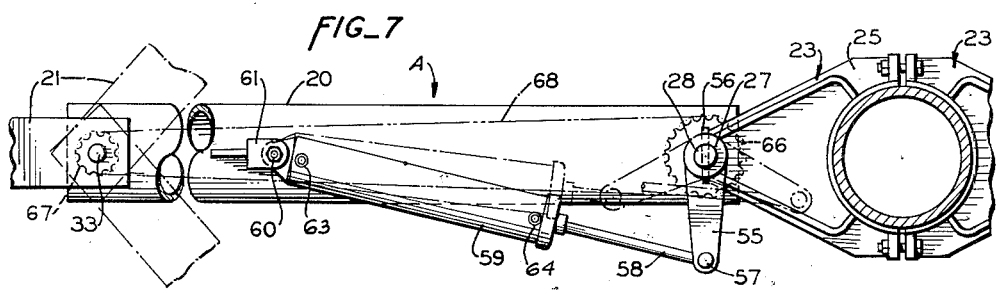
FIG_7
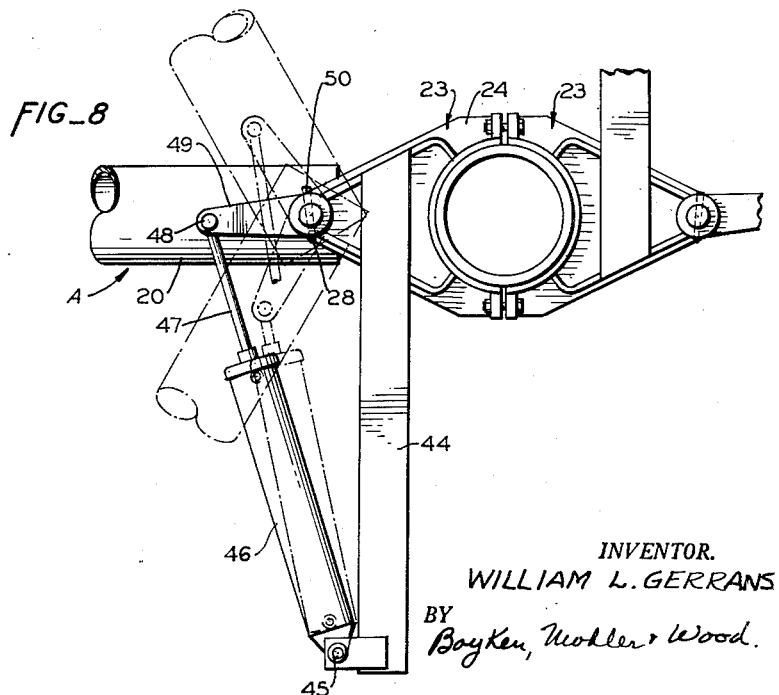
FIG_8
INVENTOR.
WILLIAM L. GERRANS
BY Boyken, Mohler & Wood.
ATTORNEYS Oct. 2, 1962
W. L. GERRANS
3,056,465
PRUNING AND FRUIT PICKING RIG
Filed March 14, 1955
4 Sheets-Sheet 4
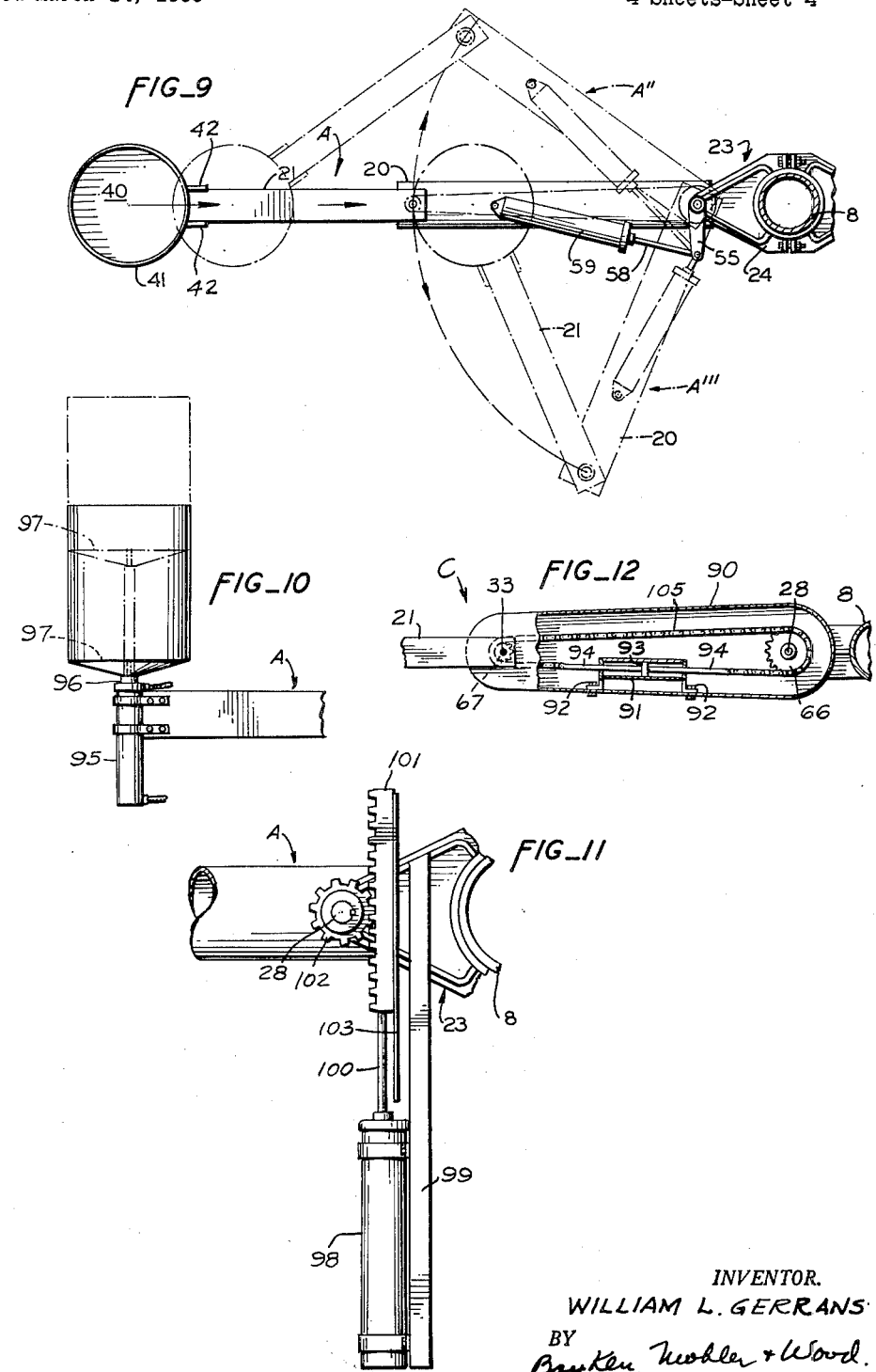
INVENTOR.
WILLIAM L. GERRANS
BY
Boyken, Mohler & Wood.
ATTORNEYS

United States Patent Office 3,056,465
Patented Oct. 2, 1962

3,056,465
PRUNING AND FRUIT PICKING RIG
William L. Gerrans, 17840 Bucknall Road,
Saratoga, Calif.
Filed Mar. 14, 1955, Ser. No. 494,166
5 Claims. (Cl. 182—148)

This invention relates to a device which permits access by an operator to a tree. More particularly the invention relates to a rig which facilitates pruning and fruit picking operations by providing a simple means for an operator to gain access to the branches of a tree.

Heretofore attempts have been made to provide various types of platforms and the like for supporting an operator in a position elevated from the ground so that the branches of the tree may be readily reached for various operations such as spraying, pruning and fruit picking.

In fruit orchards the trees are normally arranged in a predetermined spaced relationship in perpendicularly extending rows. In the past, various types of vehicles have been devised which have included elevated platforms on which one or more operators could stand so as to perform operations such as pruning.

Such prior art devices have, for the most part, failed in achieving their object, partially because they have been cumbersome and, if arranged so as to position an operator within easy reach of the branches, have, at the same time, interfered with the branches themselves, thus damaging the latter or complicating the problem of moving the platform from tree to tree.

Furthermore, little or no consideration has been given to the fact that the operator should be able to position himself between adjacent branches as well as at a point adjacent the outer periphery of the tree.

Inasmuch as the space available for passing a vehicle and platform between parallel rows of trees is relatively small adjacent a pair of trees, a device that is small enough in lateral extent to clear such a pair of trees is not of sufficient lateral extent to provide access by the operator to the inside of the tree. In other words prior art devices have not successfully solved the problem of varying the effective lateral extent of the operator's platform.

The main object of the present invention is the provision of a device for providing access of an operator to a tree which overcomes the disadvantages of prior art devices.

Another object of the invention is the provision of device for providing access by an operator to a tree for pruning, fruit picking and like operations which is extremely flexible in use and which will not injure the tree in any way.

Still another object is the provision of a pruning or fruit picking rig that provides a platform for an operator that is readily adjusted to various positions and permits the operator to move radially of the tree to gain access to the inside of the latter.

Yet another object of the invention is the provision of a pruning rig which may be arranged as desired to increase or reduce its lateral extent to permit passage of the rig between rows of trees.

Another object of the invention is the provision of a pruning rig that permits vertical adjustment of the operator's platform.

Other objects and advantages will be seen from the following specification and from the drawings wherein:

FIG. 1 is a top plan view of the apparatus of the present invention with the trailer omitted;

FIG. 2 is an enlarged side elevation of the apparatus of FIG. 1 showing a portion of the rear end of the tractor which draws the device and with one of the arms of the device broken away to accommodate the drawing to the sheet;

FIG. 3 is a top plan view of one half of the trailer, the other half being similar;

FIG. 4 is a rear elevation of the trailer with the vertical frame broken away;

FIG. 5 is a schematic piping diagram;

FIG. 6 is a greatly enlarged side elevation of the top portion of the frame post showing one of the arms secured thereto; the other arm being similar;

FIG. 7 is a bottom plan view of the structure of FIG. 6 as taken along lines 7—7 of FIG. 6;

FIG. 8 is a top plan view of that portion of the structure of FIG. 6 adjacent the post;

FIG. 9 is a bottom plan view of one of the platform carrying arms, similar to FIG. 1 and showing the movement of the operator's platform radially of the frame post;

FIG. 10 is a fragmentary side elevation of the outer end of one of the arms showing a modified form of the invention wherein the operator's platform is vertically adjustable;

FIG. 11 is a fragmentary plan view of the device showing other means for swinging the outer member of the platform support arm; and FIG. 12 shows another modified form of the invention.

In detail, the invention comprises a trailer generally designated 1 (FIGS. 2, 3, 4) that preferably is provided with a pair of ground wheels 2, 3, a transverse base 4 and a longitudinal beam 5 which in turn is adapted to be hitched to a tractor generally designated 6 (FIG. 2).

A vertically extending standard or post 8 is rigidly secured at its lower end as by welding to the transverse base 4 centrally of the latter. An upwardly and rearwardly extending brace 9 is rigidly secured at its forward end to the longitudinal beam 5 and at its rear end to the post 8 to provide longitudinal stiffening. A pair of upwardly and inwardly extending braces 11, 12, are secured to the transverse base 4 adjacent the wheels 2, 3 respectively and to the standard 8 as best seen in FIG. 4. Steps 15 may be provided as desired on one of the braces 11, 12 and one or more steps 17 on post 8 to permit an operator to climb to the top of standard 8. Horizontal bracing of longitudinal 5 to transverse base 4 may be achieved by braces.

It will be noted that wheels 2, 3 are relatively widely spaced apart to provide the requisite stability in trailer 1, but post 8, which extends upwardly to about the height of the branches of a tree, has relatively little lateral extent and therefore does not interfere in any way with the trees.

It will be understood that tractor 6 runs parallel to and centrally between two rows of trees in an orchard so that post 8 is substantially centrally between such rows at all times.

Adjacent the upper end of post 8 there are secured thereto a pair of horizontally extending arms A, B (FIG. 1). These arms A, B are secured to the forward and rear sides respectively of post 8 and inasmuch as they are identical in structure, only arm A will be described in detail; the same numerals being applied to like parts in arms A and B.

Arm A comprises an inner member or section 20 carried by post 8 and an outer member or section 21 hingedly secured to the outer end of inner member 20. Members 20, 21 are preferably hollow.

Fixedly secured to the upper end of post 8 as by welding or as by bolts 22 (FIG. 6) is a bracket generally designated 23. This bracket includes a pair of vertically spaced upper and lower horizontal webs 24, 25 which are apertured to receive a shaft 28 therethrough. Rigidly secured to upper web 24 is a bearing 51 and similarly secured to lower web 25 is a bearing 52. Shaft 28 is rotatably mounted in these bearings.

The inner end of inner member 20 of arm A is received between webs 24, 25, and is horizontally swingable on pin 28. Bearings 30, 31 secured to the upper and lower inner sides of member 20 provide ample bearing area on said member.

The distal or outer end of member 20 is hingedly secured to the outer member 21 of arm A by a vertically extending pin 33. Outer member 21 may be formed so as to include a vertically disposed web 34 and a pair of upper and lower flanges 35, 36 respectively (FIG. 2). Pin 33 may be rigidly secured as by welding to upper and lower flanges 35, 36 and upper and lower bearings 38, 39 may be welded to the upper and lower inner sides of member 20.

The outer end of member 21 of arm A that is remote from member 20 is rigidly secured to an operator's platform 40 (FIG. 9) which is preferably provided with relatively high cylindrical side-walls 41 as a safety measure. Member 21 may be welded to the sidewalls 41 and to a pair of vertically extending flat bar stiffeners 42 rigid with sidewalls 41.

From the structure thus far described it will be seen that an operator positioned on platform 40 is spaced a considerable distance from the post 8. The means by which the operator is moved to various positions will now be described.

Referring now to FIG. 8 which is a top plan view of the proximal or inner end of member 20 of arm A, an elongated extension in the form of a bar 44 is welded at one end to the bracket 23 so that it extends outwardly thereof preferably at right angles to the longitudinal axis of trailer 1.

Pivotally secured to the outer end of extension bar 44 as by pin 45 is one end of a hydraulic cylinder 46. Cylinder 46 is provided with the usual piston (not shown) to which is secured a piston rod 47. The outer end of piston rod 47 is pivotally secured as by pin 48 to the outer end of a crank 49 which is rigidly secured as by pin 50 to shaft 28. Upon extension or retracting of piston rod 47 it will be apparent that crank 49 serves to rotate shaft 28 in bearings 51, 52 that are secured as by welding to upper and lower webs 24, 25 respectively.

At this point it should be noted that if shaft 28 is prevented from rotating relative to member 20 of arm A, said member 20 will be swung with shaft 28 on bearings 51, 52.

Referring now to FIG. 7 which is a bottom plan view showing the underside of members 20, a crank 55 is fixedly secured at one end as by pin 56 to shaft 28. The outer end of crank 55 is pivotally secured by a pin 57 to the outer end of a connecting rod 58 associated with a hydraulic cylinder 59. Cylinder 59 is swingably secured at its opposite end by a bolt 60 to a bracket 61 rigid with member 20 of arm A. Oil under pressure may be supplied to opposite ends of cylinder 59 through conduits 63, 64 (FIG. 6) in a manner to be subsequently described.

Although the hydraulic system will be described later, it should be noted at this point if oil is prevented from entering cylinder 59 through either conduit 63 or 64, the shaft 28 is locked relative to member 20. Thus, upon actuation of upper cylinder 46 to rotate shaft 28 in bearings 51, 52 the member 20 will be swung horizontally as indicated in FIG. 8.

On the other hand, if upper cylinder 46 is held rigid so as to prevent rotation of shaft 28 relative to bearings 51, 52 actuation of lower cylinder 59 will also swing member 20. However in this latter case it will be noted that shaft 28 is stationary whereas, when cylinder 59 is locked, shaft 28 rotates in bearings 51, 52 when cylinder 46 is actuated.

Between bearings 30, 31 shaft 28 is provided with a sprocket wheel 66 which is fixed to said shaft. Similarly, between bearings 38, 39, pin 33 is provided with a fixed sprocket wheel 67. Sprocket wheels 66, 67 are connected by a sprocket chain 68 disposed within member 20.

It will be apparent when shaft 28 and member 20 are held together by nonaction of cylinder 59 that swinging of member 20 in bearings 51, 52 will not result in rotation of sprocket wheel 66 relative to member 20. In fact such rotation is positively prevented, as is rotation of sprocket wheel 67, so that swinging of the outer member 21 of arm A is also prevented. Thus, actuation of cylinder 46 with cylinder 59 fixed, results in arm A being swung as a unit as if the articulation between members 20, 21 were not present.

On the other hand, assuming upper cylinder 46 fixed, actuation of lower cylinder 59 results in member 20 being swung relative to the stationary shaft 28, thus effecting relative rotation between sprocket wheel 66 and member 20. Actually, sprocket wheel 66 is stationary, so that when member 20 is swung, sprocket 67 is rotated by chain 68. Rotation of sprocket wheel 67, with the pin 33 to which it is secured causes swinging of outer member 21 relative to member 20. The number of teeth in sprocket wheel 67 is preferably one half the number of teeth in sprocket wheel 66. The result of this is that outer member 21 swings through twice the arc that inner member 20 swings through when the lower cylinder 59 is actuated.

The reason for the above described structure is best seen in FIG. 1 wherein arms A and B are shown in full line. With respect to arm B it is seen that by extending upper cylinder 46 only said arm is moved to position B'' whereas by retracting upper cylinder 46, the arm is moved to position B'.

With respect to arm A, and if it is assumed that the same has been moved to a position A'' (not shown) by extending cylinder 46 the platform 40 may then be moved radially inwardly of post 8 to position $A_1''$, by extending lower cylinder 59 (FIG. 5). Similarly platform 40 may be moved radially inwardly from position A' to position $A_2'$ by extending lower cylinder 59.

It will be understood that the articulation of arms A, B may be employed at any point in the arc of swing of inner member 20. FIG. 9 shows arm A in full line in its fully extended position longitudinally disposed relative to the path of travel of trailer 1. The platform 40 may be moved radially inwardly of post 8 to the position A''' by retracting cylinder 59, and may also be moved radially inwardly to the position A'' by extending cylinder 59. It has been assumed of course in the above explanation that when lower cylinder 59 is actuated upper cylinder 46 is inactive. However, it will be understood that both cylinders may be operated simultaneously.

Referring now to the diagrammatic piping diagram of FIG. 5, an oil tank 72 may be provided on tractor 6 and connected to a continuously running pump 73 by line 74. An unloading valve 87 and a check valve 88 may be employed in the system in the usual manner as shown. To maintain the desired pressure at all times an accumulator 89 may receive the output from pump 73. A fourway valve 75 is connected to the pressure side of pump 73 by a line 76 and to opposite ends of cylinder 59 by lines 63, 64. The return to tank 72 from valve 75 is by pipe 77.

A similar four way valve 79 controls cylinder 46 to the opposite ends of which valve 79 is connected by conduits 80, 81. Pressure and return lines 82, 83 are connected with valve 79 in the same manner as lines 76, 77 to valve 75.

It will be understood that the piping for cylinders 46, 59 of arm B is the same as that described above for arm A. Valves 75, 79 are provided with operating handles 84, 85 respectively so that when said valves are positioned on sidewalls 41 of platform 40 said handles are within easy reach of the operator on platform 40 (FIG. 2).

In operation, the tractor 6 (FIG. 2) is driven between the rows of trees of an orchard and may be stopped with the wheels 2, 3 of the trailer 1 adjacent corresponding trees of the rows. Arm A may be swung toward one tree and arm B toward the other or both arms may be swung to opposite sides of the same tree (FIG. 1). Inasmuch as the platform 40 may be moved radially of the tree (i.e. radially of post 8) it is a simple matter to gain access to the interior of the tree.

It takes very little time for an operator to become proficient in actuating valves 75, 79 so as to move himself in any desired direction.

It will be understood that various methods other than that described above may be employed to actuate arms A, B. For example, as seen in FIG. 11, a hydraulic cylinder 98 may be fixedly secured to bracket 23 on post 8 as by extension member 99 instead of pivotally secured as is cylinder 46 (FIG. 8). In such a case the piston rod 100 is integrally provided with a rack 101 which coacts with a pinion 102 on shaft 28. Guide means 92 or the like should also be employed to insure straight line movement of rack 101.

It will be understood that a similar rack and pinion arrangement may be provided at the lower end of shaft 28 if desired; however, in such a case the cylinder should be secured to member 20 of arm A.

Another modification is shown in FIG. 10 wherein the outer end of arm A is provided with a hydraulic cylinder 95 to the piston rod 96 of which is secured on operator's platform 97. By connecting the cylinder 95 to the hydraulic system through appropriate conduits the elevation of the operator's platform may be adjusted as desired as shown in FIG. 10. Obviously the same result may be obtained by using a rack and pinion arrangement or any other lifting device. In the case of prune trees, vertical movement of the platform is not usually essential but for most trees vertical shifting is required for complete access to the tree.

Still another modification is shown in FIG. 12 wherein a different apparatus is employed to swing the arm. In this case the arm is designated C and the outer member 21 thereof may be identical to the outer member 21 of arm A (FIG. 9). However, in lieu of the inner member 20 of FIG. 9 there is provided a hollow inner member 90 which is horizontally elongated and swingably supported at its opposite ends to outer member 21 by means of pin 33 and to the post 8 by means of pin 28.

The upper cylinder 46 (not shown in FIG. 12) is employed in the modified form of FIG. 12 as above described. However, the lower cylinder 59 is dispensed with and in lieu thereof the cylinder 91 is employed.

Cylinder 91 is secured within member 90 by bolts 92 and is provided with a piston 93 having two oppositely directed connecting rods 94 to the outer ends of which are secured the opposite ends of chain 105. Chain 105 is received around sprocket wheels 66, 67 on pins 28, 33 respectively which have hereinbefore been described.

The piping to cylinder 91 is the same as to cylinder 59 and it will be seen that, depending upon the direction in which the piston 93 is driven by the application of air pressure, the sprocket 67 will be rotated in one direction or the other. In other words, the actual function of lower cylinder 59 (FIGS. 6, 7) is duplicated by cylinder 91 but the latter is completely contained within the inner member of the arm.

It should be noted at this point that when arms A, B or C are straight, the cylinder 59, or the corresponding cylinder 91, are in their intermediate position, so that articulation may be brought about in either direction. This is best seen in FIG. 9.

The most important feature of the invention is its flexibility. Thus, once the trailer 1 is stopped alongside a tree, the operator's platform may be moved radially inwardly and outwardly of the tree from various points around the tree without moving the trailer. This feature distinguishes the present invention from prior art devices that permit movement of the operator along a single radius relative to the tree for one position of the trailer. Furthermore both platforms may be simultaneously operating on the same tree.

The above specific description of the invention should not be taken as restrictive of the same as it is obvious that various changes in design may be resorted to without departing from the spirit of the invention as defined in the following claims.

I claim:
1. In a working platform support including a frame adapted to be supported at its lower end on the ground and an articulated arm connected at its inner end to said frame and at its outer end to said platform, said arm comprising: an inner member, an inner pivot on said frame supporting said inner member for swinging relative to said frame, an outer member, an outer pivot fixed to and supporting said outer member for swinging relative to said inner member, first motor means connecting said frame and said inner pivot for swinging said inner member relative to said frame, second motor means connecting said inner member and said inner pivot for swinging said inner member relative to said inner pivot, and driving means connecting said inner and outer pivots for swinging said outer member relative to said inner member.

2. In a working platform support including a frame adapted to be supported at its lower end on the ground and an articulated arm connected at its inner end to said frame and at its outer end to said platform, said arm comprising: an inner member, an inner pivot on said frame supporting said inner member for swinging relative to said frame, an outer member, an outer pivot fixed to and supporting said outer member for swinging relative to said inner member, first motor means connecting said frame and said inner pivot for swinging said inner member relative to said frame, second motor means connecting said inner member and said inner pivot for swinging said inner member relative to said inner pivot, and driving means connecting said inner and outer pivots for swinging said outer member relative to said inner member, said driving means including a chain drive for rotating said outer pivot upon rotation of said inner member.

3. In a working platform support including a frame adapted to be supported at its lower end on the ground and an articulated arm connected at its inner end to said frame and at its outer end to said platform, said arm comprising: an inner member, a first vertically disposed shaft rotatably supported on said frame and rotatably secured to the inner end of said inner member, an outer member, a second vertically disposed shaft rotatably secured to the outer end of said inner member and fixed to the inner end of said outer member, first motor means connecting said frame and said first shaft for rotating said first shaft relative to said frame, second motor means connecting said inner member and said first shaft for rotating said first shaft relative to said inner member, and driving means connecting said shafts for rotation together.

4. In a working platform support including a frame adapted to be supported at its lower end on the ground and an articulated arm connected at its inner end to said frame and at its outer end to said platform, said arm comprising: an inner member, a first vertically disposed shaft rotatably supported on said frame and rotatably secured to the inner end of said inner member, an outer member, a second vertically disposed shaft rotatably secured to the outer end of said inner member and fixed to the inner end of said outer member, first motor means connecting said frame and said first shaft for rotating said first shaft relative to said frame, second motor means connecting said inner member and said first shaft for rotating said first shaft relative to said inner member, and driving means connecting said shafts for rotation together, said driving means being adapted to rotate said second shaft through twice the angular movement of said first shaft.

5. In an arm structure of the character described: a central frame, an inner member swingably secured at its inner end to said frame, an outer member swingably secured at its inner end to the outer end of said inner member and adapted to support a platform at its outer end, inner pivot means swingably securing said inner member to said frame and outer pivot means swingably securing said outer member to the outer end of said inner member, motor means connecting said frame with said inner arm for swinging the latter relative to said frame, and driving means connecting said inner and outer pivot means for swinging said outer member relative to said inner member upon swinging of said inner member relative to said frame.

References Cited in the file of this patent

UNITED STATES PATENTS

| | | |
|---|---|---|
| 2,450,812 | Ray | Oct. 5, 1948 |
| 2,601,092 | Cardiff | June 17, 1952 |
| 2,616,768 | Stemm | Nov. 4, 1952 |
| 2,674,500 | Hukari | Apr. 6, 1954 |
| 2,701,168 | Schemers | Feb. 1, 1955 |
| 2,798,623 | Girardi | July 9, 1957 |